(12) United States Patent
Noehring et al.

(10) Patent No.: US 7,194,766 B2
(45) Date of Patent: Mar. 20, 2007

(54) METHOD AND SYSTEM FOR HIGH-SPEED PROCESSING IPSEC SECURITY PROTOCOL PACKETS

(75) Inventors: Lee P. Noehring, Peoria, AZ (US); Chad W. Mercer, Chandler, AZ (US); David Cassetti, Tempe, AZ (US); Michael Privett, Gilbert, AZ (US); Satish Anand, Chandler, AZ (US)

(73) Assignee: Corrent Corporation, Tempe, AZ (US)

( * ) Notice: Subject to any disclaimer, the term of this patent is extended or adjusted under 35 U.S.C. 154(b) by 224 days.

(21) Appl. No.: 09/880,701

(22) Filed: Jun. 13, 2001

(65) Prior Publication Data

US 2002/0188839 A1   Dec. 12, 2002

(51) Int. Cl.
*G06F 9/00* (2006.01)
(52) U.S. Cl. .................... 726/13; 726/14; 713/153
(58) Field of Classification Search ............ 713/150; 709/200–253; 370/431; 710/100; 726/13, 726/14
See application file for complete search history.

(56) References Cited

U.S. PATENT DOCUMENTS

| | | | |
|---|---|---|---|
| 5,228,083 A * | 7/1993 | Lozowick et al. .......... 713/160 |
| 5,301,287 A * | 4/1994 | Herrell et al. .............. 711/202 |
| 5,528,587 A * | 6/1996 | Galand et al. .............. 370/412 |
| 5,948,080 A * | 9/1999 | Baker ......................... 710/37 |
| 6,094,437 A | 7/2000 | Loehndorf, Jr. et al. |
| 6,173,399 B1 | 1/2001 | Gilbrech et al. |
| 6,182,149 B1 | 1/2001 | Nessett et al. |
| 6,226,748 B1 | 5/2001 | Bots et al. |
| 6,253,321 B1 * | 6/2001 | Nikander et al. ........... 713/160 |
| 6,477,646 B1 * | 11/2002 | Krishna et al. ............. 713/189 |

FOREIGN PATENT DOCUMENTS

| | | |
|---|---|---|
| WO | 99/67930 A | 12/1999 |
| WO | 01/03362 A | 1/2001 |
| WO | 01/05089 A | 1/2001 |
| WO | 01/06704 A | 1/2001 |

OTHER PUBLICATIONS

International Search Report mailed Oct. 17, 2002 form European Patent Office for counterpart PCT application No. PCT/US02/19079.

* cited by examiner

*Primary Examiner*—Ayaz Sheikh
*Assistant Examiner*—Pramila Parthasarathy
(74) *Attorney, Agent, or Firm*—Ingrassia Fisher & Lorenz (57) ABSTRACT

A packet processing system is embodied on an ASIC is optimized for processing IPSec security protocol packets in a hardware configuration. Embedded RISC processors operate with hardware support modules providing for IPSec packet processing at OC24 data rates and greater. IPSec packets are received through a streaming interface and buffered in an external memory. When the entire packet is in external memory, portions are buffered in a local memory for crypto-processing. As portions of the packets complete processing, the portions are buffered to an output portion of the external memory associated with the channel. When an entire packet competes processing, portions are buffered to a local memory for streaming. The hardware accordingly reduces the involvement of the RISC processors and significantly increases channel throughput providing for high-speed IPSec packet processing.

32 Claims, 7 Drawing Sheets

METHOD AND SYSTEM FOR HIGH-SPEED PROCESSING IPSEC SECURITY PROTOCOL PACKETS

FIELD OF THE INVENTION

The present invention relates to the field of data communications, and particularly to internet protocol (IP) communications that implement security protocols, and more particularly, to processing IPSec security protocol packets to achieve high-speed security for IP networks.

BACKGROUND OF THE INVENTION

Security protocols are used widely in modern day communications to provide security over different physical, logical or virtual mediums. One purpose of security protocols relate to information hiding. One such security protocol is the standard IPSec internet protocol security specified in "Request for Comment" (RFC) 2401, 2402 and 02406. The IPSec protocol may be implemented in either a tunneling mode or a transport mode. In a typical tunnel, unicast addresses are used to set up a "tunnel" between two nodes across a network. Tunneling enables one network to send data via another network's connections by encapsulating one protocol within packets carried by the second network. For example, links between intermediate stations on the internet are managed independently and are often transparent to the end stations.

IPSec security protocol communication may be established for example, between separate locations of an organization to help protect data communications between the locations. The use of IPSec security enables parties to establish a secure virtual private network (VPN).

One problem with processing packets that implement a security protocols such as IPSec is that the processing requirements are such that high speed packet communications are difficult to achieve. Basically, outbound packets must be encapsulated in accordance with the IPSec requirements and inbound IPSec packets must be un-encapsulated. For example, IPSec packet processing implemented in a typical software processing system are not able to readily achieve, for example, OC24 level communications which are desirable for many networks. In the near future, it is desirable to achieve IPSec communications at OC192 data rates, for example in broadband communication networks.

Thus what is needed is a system and method that provides for improved IPSec packet processing. What is also needed is a system and method that provide for IPSec processing at at least OC24 data rates. What is also needed is a system and method for IPSec processing that is scalable for higher data rates. What is also needed is an application specific integrated circuit (ASIC) that performs high-speed processing of IPSec packets.

SUMMARY OF THE INVENTION

In accordance with the preferred embodiments, an application specific integrated circuit (ASIC) is provided for processing IPSec security protocol packets. In accordance with one of the preferred embodiments, the ASIC comprises a first streaming interface for communicating with a network processor over a streaming interface such as a Packet-Over-SONET Physical-Layer Three (POS-PHY3) interface for receiving a streamed packet. The ASIC also includes an input buffer for storing portions of the streamed packet along with control information for the packet, a crypto core engine for performing IPSec cryptographic operations on the packet, an output buffer for storing processed portions of the streamed packet, and a second streaming interface for receiving the processed portions of the streamed packet from the output buffer and providing the network processor a processed IPSec packet over the streaming interface.

In accordance with the preferred embodiment, a channel is selected from a plurality of channels for processing the streamed packet. The input buffer has a portion associated with each channel. In accordance with this embodiment, the ASIC includes a plurality of RISC processing cores. Each processing core is associated with one of the channels and controls the processing of IPSec security protocol packets through the associated channel.

In accordance with the preferred embodiment, a transmitting (Tx) direct memory access (DMA) interface receives a streamed security data packet, and selects a channel for processing the streamed security data packet and transfers the streamed security data packet to an external memory. An input DMA engine retrieves portions of the streamed security data packet from the external memory after all portions of the streamed security data packet have been transferred to the external memory. An input FIFO receives the portions of the streamed security data packet from the input DMA engine in blocks of a predetermined byte size. The portions are retained in a portion of the input FIFO allocated to the selected channel. A context RAM receives a security association database (SAD) entry associated with the selected channel. The SAD entry is retrieved from an external memory by the input DMA engine. An input crypto DMA engine provides the blocks of the security data packet to a processing engine for processing when the processing is available to process the packet. As can be seen, any latency associated with accessing external memory is significantly reduced.

In accordance with this embodiment, the output portion of the system includes an output crypto FIFO that receives the processed blocks of the security packet from the processing engine, an output DMA engine that transfers the processed blocks of the security packet to an external output memory, and a receiving (Rx) DMA interface that retrieves the processed blocks of the security packet from the external output memory after all portions of the processed security data packet have been transferred to the external output memory (158). The receiving (Rx) DMA interface transfers the processed blocks of the security data packet to a streaming interface for streaming.

The receiving (Rx) DMA interface preferably includes a plurality of registers for storing length information for each of a plurality of processed security data packets. The receiving (Rx) DMA interface (324) performs the retrieving in response to the storing of the length information for an associated processed security data packet. The context RAM preferably includes a portion storing program state information associated with the selected channel. The transmitting (Tx) DMA interface preferably selects a least busy channel based on an amount of buffer space available for a channel in the external memory. When the security packet is an outbound IPSec security packet, an outer header and IPSec header are added to the outbound IPSec security packet when portions of the packet are buffered in input FIFO. When the security packet is an inbound IPSec security packet, an outer header and IPSec header are removed from the outbound IPSec security packet prior to portions of the packet being buffered in input FIFO.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a system and method for improved IPSec packet processing. In accordance with one preferred embodiment, an application specific integrated circuit (ASIC) provides for hardware acceleration of IPSec packet processing through a novel hardware configuration, the use of hardware acceleration engines and RISC processor cores. IPSec processing is provided for both inbound and outbound packets. The IPSec packet processing system and method of the present invention, provides for encryption, decryption, signing and verification of data packets at OC24 full duplex and greater. The IPSec packet processing system and method of the present invention also provides for encryption and decryption operations using for example, the Data Encryption Standard (DES), triple-DES or the Advanced Encryption Standard (AES) algorithms. The IPSec packet processing system and method of the present invention also provides for message authentication algorithms such as HMAC-MD5 and HMAC-SHA1.

In accordance with the preferred embodiments, the IPSec packet processing system and method of the present invention may be used to implement IPSec in the "tunnel" mode as well as the "transport" mode, as well as implementing both the encapsulation security protocol (ESP) and authentication header (AH) protocol. In general, the encapsulated fields of IPSec ESP packets are encrypted and may be authenticated, while the encapsulated fields of IPSec AH packets are authenticated.

The elements that implement the various embodiments of present invention are described, in some cases below at an architectural level. Many elements may be configured using well known structures. The functionality and processes described herein are described in such a manner to enable one of ordinary skill in the art to implement the functionality and processes within the architecture.

Figure 1:
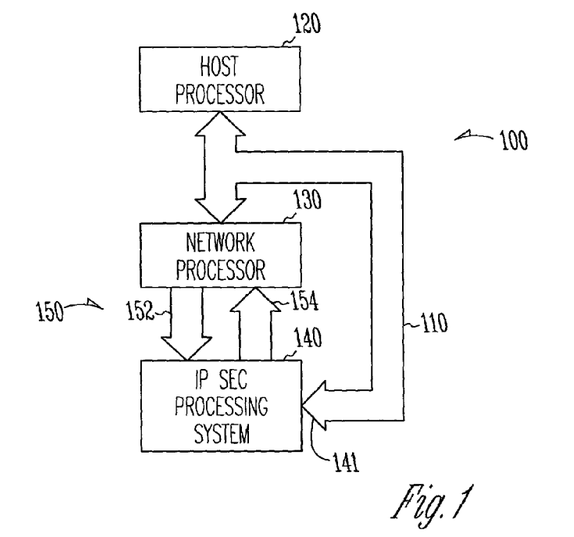
FIG. 1 illustrates a simplified functional block diagram of a system architecture suitable for use in implementing the preferred embodiments of the present invention.

FIG. 1 illustrates a simplified functional block diagram of a system architecture suitable for use in implementing the preferred embodiments of the present invention. Architecture 100 includes host processor 120 coupled to network processor 130 by a host control bus 110 which also couples to processing system 140. Host control bus 110 is preferably a PCI bus although other bus types are suitable. Processing system 140 is preferably a processing system optimized for performing IPSec processing. Processing system 140 is coupled to networks processor 130 by way of streaming interface 150. Interface 150 is preferably a Packet-Over-SONET Physical-Layer Three (POS/PHY3) type streaming interface, although UTOPIA, LX SPI-4 and other interface types are suitable. IP data packets are both received and transmitted to and from an external network via network processor 130. Network processor 130 provides processing system 140 with outbound and inbound data packets that may require IPSec processing. In other words, inbound packets formatted for IPSEC security are received by network processor 130 are routed to IPSEC processing system 140 over streaming interface 150. IPSEC processing system 140 performs IPSEC processing on the received inbound packets and returns the processed packets back to network processor 130. Outbound packets that are to be formatted for IPSEC security are provided by network processor 130, processed in IPSEC processing system 140 and returned to network processor 130 through the streaming interface 150.

Streaming interface 150 comprises first streaming interface 152 (e.g., a transmitting (Tx) interface) through which streamed packets are received by processing system 140, and second streaming interface 154 (e.g., a receiving (Rx) interface) through which streamed packets are provided to processing system 140. Host processor 120 is a processing system that communicates with network processor 130 and IPSEC processing system 140 over bus 110. Bus 110 includes interface 141 to IPSec processing system 140. Host control bus 110 provides for, among other things, the communication path for slower path functions that are less time critical for packet processing. These function may include, for example, security association database (SAD) maintenance, packet exception logging and other management functions related to the IPSec processing that are performed in processing system 140.

Interface 150 is preferably streaming slave type interface operating at a clock-rate of around 133 MHz supporting a bit-rate throughput of at least 2.5 Gbps in full duplex operation. PCI interface 141 is preferably a 32-bit 66 MHz PCI interface which is used for overhead operations including maintenance operations for SAD entries, exception logging, maximum transmission unit violations, and external memory management.

Figure 2:
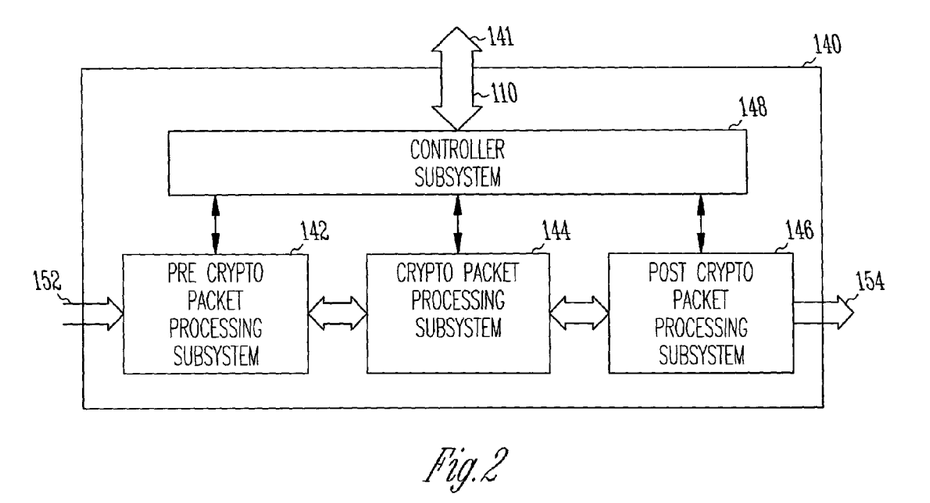
FIG. 2 illustrates a high level simplified functional block diagram of a packet processing system in accordance with a preferred embodiment of the present invention.

FIG. 2 illustrates a high level simplified functional block diagram of a packet processing system in accordance with a preferred embodiment of the present invention. Processing system 140 comprises controller subsystem 148, pre-crypto packet processing subsystem 142, crypto packet processing subsystem 144 and post-crypto packet processing system 146. Streaming interfaces 152 provides packets that are to be processed in system 140 while streaming interface 154 provides packets processed by system 140. Controller subsystem 148 communicates with subsystems 142, 144 and 146 over internal busses. In accordance with the preferred embodiment of the present invention, pre-crypto packet processing system 142 receives packets from network processor 130 over streaming interface 152 and performs packet pre-processing needed to prepare the packet for processing by crypto packet processing system 144.

In general, for outbound IPSec packets, pre-crypto packet processing system 142 reads a security associated database (SAD) tag followed by the reading of an SAD entry corresponding with the channel into local memory. A byte count and sequence number are updated for that entry. It performs packet lifetime checks and builds an outer IP header for the outbound IPSec packet. In accordance with the preferred embodiments of the present invention, processing system 140 generates outbound IPSEC security protocol packets and builds the outer IPSEC headers prior to performing crypto operations on the packet. The procedure for processing outbound IPSec packets is described in detail in FIG. 8 below.

For inbound IPSec packets, in other words IPSec packets that include an IPSec header (among other things), IPSEC processing system 140 parses the header of the packet to locate an IPSEC header, performs lifetime checks on the packet, in some cases zeroes mutable fields in an outer IP header and adds crypto control information prior to sending the packets to crypto processing subsystem 144. The procedure for processing inbound IPSec packets is described in detail in FIG. 9 below.

Crypto packet processing subsystem 144 performs cryptographic operations on an IPSec packet on both outbound or an inbound IPSec packets. For example, for outbound packets, an encryption operation and/or a signing operation may be performed. For inbound packets, decryption and/or authentication type operations may be performed.

Post-crypto packet processing subsystem 146, in accordance with the preferred embodiments of the present invention, performs IPSEC processing after crypto packet processing subsystem 144 has processed the packet. For example, for outbound packets, values are replaced in the mutable fields (for AH packets) of the outer IP header, and a message authentication code may be added prior to the packet being sent to network processor 130 over streaming interface 154. For inbound packets, for example, a SAD entry is read into local memory, the message authentication code (MAC) is verified, and security checks are performed to verify that the inner IP source address is correct for the particular tunnel. In addition, for inbound packets, anti-replay checks are also performed prior to sending the packet to network processor 130 over streaming interface 154. Firmware used to perform this packet processing preferably resides in controller subsystem 148. The procedures for processing inbound and outbound IPSec packets are described in more detail respectively in FIG. 8 and FIG. 9 below.

Figure 3:
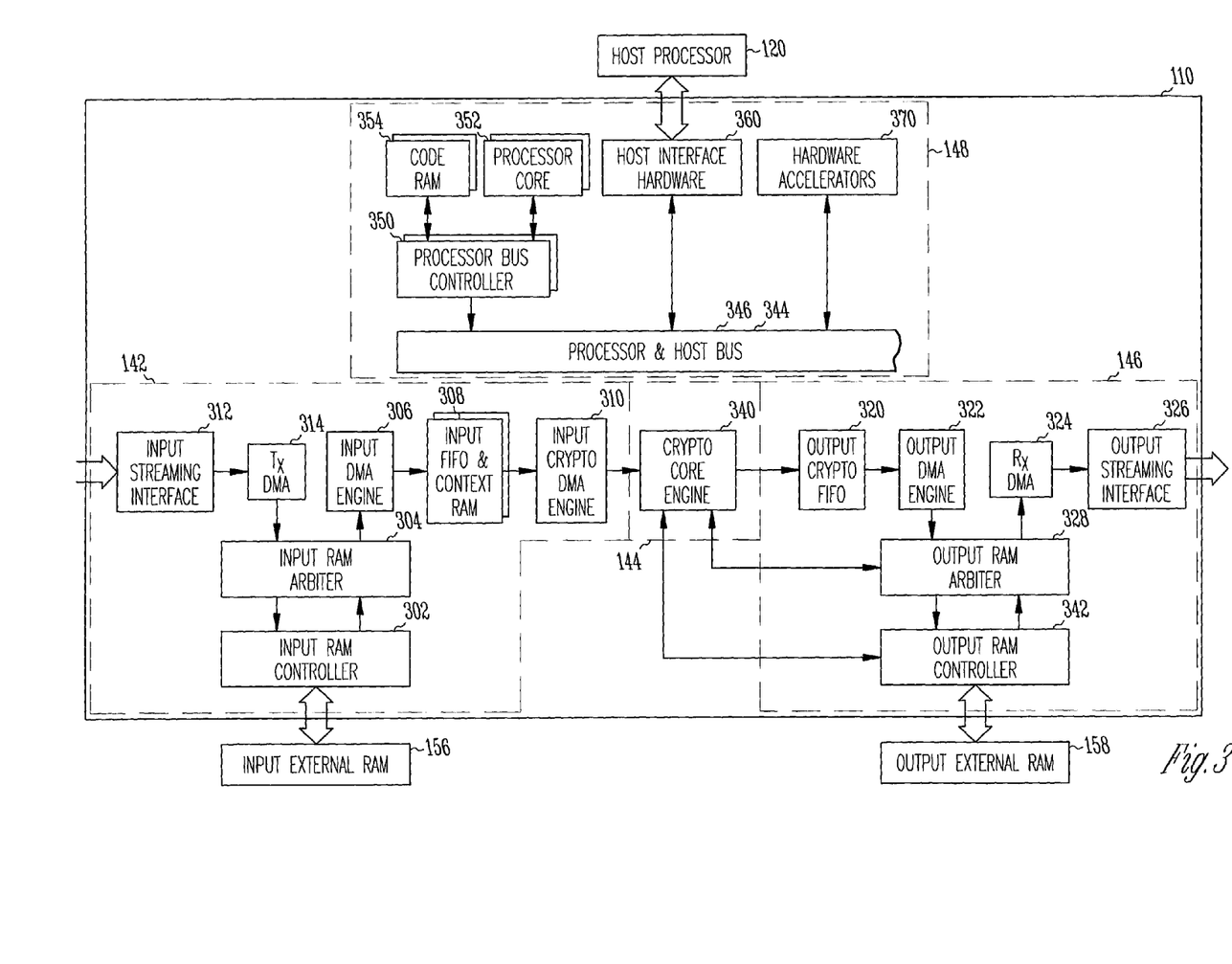
FIG. 3 illustrates a more detailed functional block diagram of a packet processing system in accordance with a preferred embodiment of the present invention.

FIG. 3 illustrates a more detailed functional block diagram of a packet processing system in accordance with a preferred embodiment of the present invention. Input streaming interface 312 provides for receipt of streamed packets from network processor 130. Transmitting (Tx) direct memory access (DMA) interface 314 transfers the streamed packets into an external buffer, shown as input external RAM 156. In accordance with a preferred embodiment of the present invention, Tx DMA interface 314 selects one of several channels for processing the input data packet. A least busy channel is preferably selected based on an amount of buffer space available for that channel in the external memory (156). Input DMA 314 is a DMA engine that provides for the transfer of data packets from input streaming interface 312 to input external RAM 156 through several control registers accessed by a processing core 352.

Input RAM arbiter 304 requests access to external RAM 156 from multiple sources which may include host processor 120, processor cores 352, input DMA 314, etc., and grants access to the highest priority requester. Input controller RAM 302 provides a memory bus protocol to read and write to and from input external RAM 156.

In operation, Tx DMA interface 314 receives a streamed security data packet, selects a channel for processing the streamed security data packet and transfers the streamed security data packet to external memory 156. Input DMA engine 306 retrieves portions of the streamed security data packet from the external memory when all portions of the streamed security data packet have been transferred to the external memory. In other words, the entire packet is stored in the external memory before input DMA engine will retrieve it. Input FIFO 308 receives the portions of the streamed security data packet from input DMA engine 306 in blocks of a predetermined byte size. The blocks of the packet are retained in a portion of input FIFO 308 allocated to the selected channel. The predetermined sized of the data blocks are preferably 64-bytes, however other sizes are also suitable. Context RAM 308 receives a security association database SAD entry associated with the selected channel. The SAD entry is retrieved from an external memory by input DMA engine 306. Context RAM 308 also stores state information for the channel therein. Input crypto DMA engine 310 provides the blocks of the security data packet to a processing engine for processing. Context RAM 308, although shown as part of FIFO 308 is logically separate and may be implemented as a separate functional element. Input DMA engine 306 keeps FIFO 308 full as blocks of the packet are retrieved by input crypto DMA engine 310.

Input DMA engine 306 provides for data transfer from RAM 156 for each channel through control registers accessed by one of the processing cores 352. In accordance with the preferred embodiment of the present invention, pre-crypto packet processing system 142 comprises a plurality of input FIFO/context RAMs 308, preferably one for each channel. Input crypto DMA engine 310 provides for data transfer from the input FIFO/context RAM 308 to associated buffers of crypto core engine 340. A data transfer is performed for a particular channel through its control registers which are accessed by the processor cores.

A plurality of independent channels are preferably used to process many independent packets concurrently. In accordance with the preferred embodiment, eight independent channels process up to forty packets, wherein each channel processes five 64-byte packets concurrently. It should be noted that a major benefit of the architecture described in FIG. 3 is that it is scalable so that it may easily be configured to implement many channels. In one embodiment of the present invention, half the channels are allocated to inbound packet processing while the other half of the channels are allocated to outbound packet processing, although any channel allocation scheme may be equally suitable.

Input external RAM 156 and Output External RAM 158 are preferably 64-bit DDR-SDRAM elements that run at a 133 MHz clock cycle or greater for buffering packets and storing security associations associated with the packets.

Each processor core 352 is preferably a 32-bit RISC processor core that operates at least 200 MHz. Firmware running on the processor cores coordinate operation of the various hardware elements as packets progress through the processing system, including the IPSec packet processing operations described below.

Crypto core engine 340 provides the crypto processing functionality for encryption, decryption, hashing, authentication and other functions performed on IPSEC data packets. In accordance with the preferred embodiment of the present invention, multiple parallel processing threads (i.e., the channels) are used to achieve very high throughput. Crypto core engine 340 couples to input crypto DMA engine 310 and output crypto FIFO 320 through streaming interfaces that provide for sufficient input and output FIFO buffering for each channel. In accordance with the preferred embodiment of the present invention, post-crypto packet processing system 146 comprises a plurality of output crypto FIFOs 320, preferably one for each channel.

The operation of post-crypto packet processing system 146 is described as follows. Output crypto FIFO 320 receives processed blocks of a security packet from the processing engine, the output DMA engine 322 transfers the processed blocks of the security packet to external output memory 158, Rx DMA interface 324 retrieving the processed blocks of the security packet from the external output memory 158 after all portions of the processed security data packet have been transferred to the external output memory 158. Rx DMA interface 324 transfers the processed blocks of the security data packet to a streaming interface for streaming. Rx DMA interface 324 preferably includes a plurality of registers storing length information each of a plurality of processed security data packets. The Rx DMA interface 324 performs the retrieving of processed packets from external memory 158 in response to the storing of the length information for an associated processed security data packet.

Output RAM controller 342 provides the memory bus protocol to read and write to output external RAM 158. RAM 158 provides for storage and buffering output data for each channel. RAM 158 also provides access to data structures that include keys and other data used by crypto core engine 340 for cryptographic processing operations. Output crypto FIFO 320 contains memory elements that receives processed data from the crypto core engine. Output DMA engine 322 provides for data transfer from the output FIFO 320 to external RAM 158. Each channel is preferably processed through separate control registers accessed by the processor cores. Output RAM arbiter 328 provides for the sharing of the output RAM bandwidth between crypto core engine 340 and Rx DMA interface 324.

Rx DMA interface 324 is a DMA engine that allows the transfer of data from the output RAM 158 to output streaming interface 326 for each streaming channel through control registers that are accessed by the processor cores. Streaming interface 326 allows the network processor to receive streaming data when processing is completed by packet processing system 140. A bus protocol provides for the identification of a channel number that is associated with the streaming data.

Controller subsystem 148 includes a plurality of processor cores 352 that provide hardware control and memory data processing. In accordance with the preferred embodiment of the present invention, controller subsystem 148 includes a plurality of processor cores 352, one for each channel. Controller subsystem 148 also includes a plurality of code RAMs 354, each associated with a particular processor core. Each code RAM 354 provides for the microcode execution by processor core 352. In accordance with a preferred embodiment, each processor core 352 has a dedicated bus controller 350 for accessing instructions, hardware control registers, and memory data. Hardware accelerators 370 provide for hardware acceleration of, for example, checksum operations, anti-replay operations, etc. Hardware accelerators 370 provide for hardware acceleration which improves performance over what is typically achievable in micro code. Host interface 360 allows for read/write access to configuration registers and local RAMs by the external host processor 120.

Figure 4:
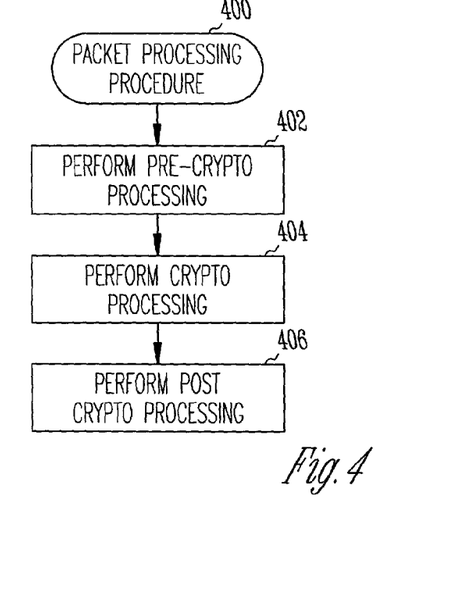
FIG. 4 illustrates a simplified flow chart of a procedure for processing packets in accordance with a preferred embodiment of the present invention.

FIG. 4 illustrates a simplified flow chart of a procedure for processing packets in accordance with a preferred embodiment of the present invention. Packet processing procedure 400 includes performing pre-crypto packet processing operations in step 402, performing post crypto packet processing operations in 406, and performing crypto packet processing operations in step 404. In accordance with the preferred embodiment of the present invention, procedure 400 is performed by packet processing system 140 (FIG. 1). Task 402 is preferably performed by pre-crypto packet processing subsystem 142 (FIG. 2), step 404 is preferably performed by crypto packet processing subsystem 144 (FIG. 2), and step 406 is preferably performed by post crypto packet processing subsystem 146 (FIG. 2).

Figure 8:
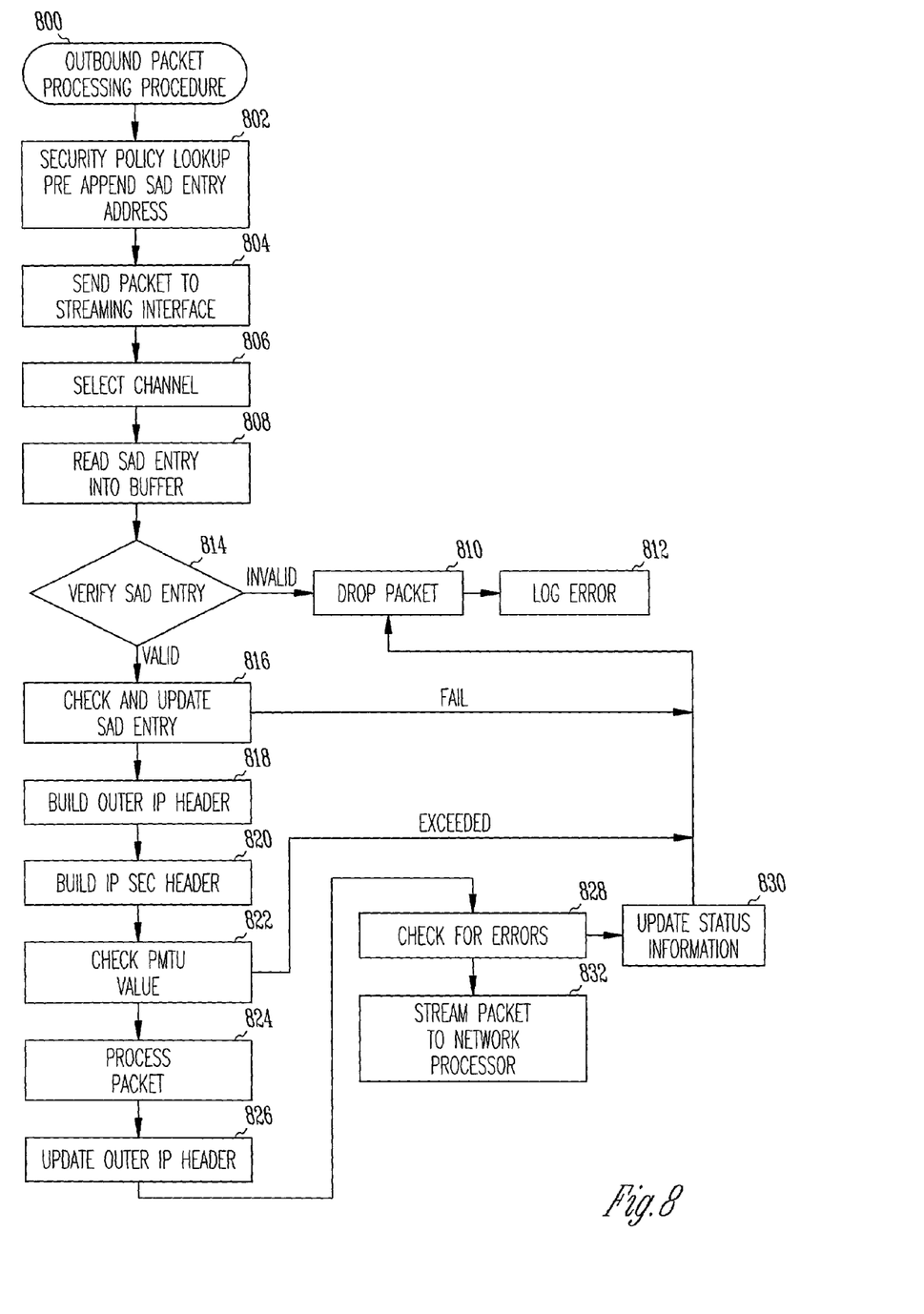
FIG. 8 illustrates a simplified flow chart of a procedure for processing outbound packets in accordance with a preferred embodiment of the present invention.

In step 402, packets are received from the network processor. Different operations are performed depending on whether the packet is an outbound packet or an inbound packet. For outbound packets, packet processing procedure 400 encapsulates the packet in accordance with the IPSEC security protocol implementation. For inbound packets, the encapsulation is removed. FIG. 8 details the steps for outbound packet processing while FIG. 9 details the steps for inbound packet processing.

Figure 5:
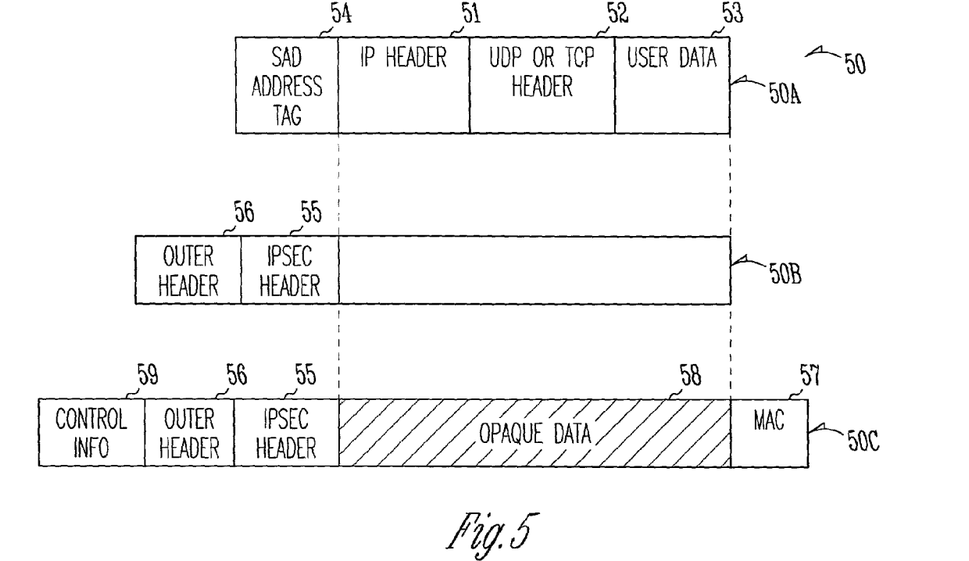
FIG. 5 illustrates a simplified diagram of an outbound IPSec data packet in accordance with a preferred embodiment of the present invention.

FIG. 5 illustrates a simplified diagram of an outbound IPSEC data packet in accordance with the preferred embodiment of the present invention. Initially, outbound IP data packet 50 typically includes an IP header 51, a upper layer protocol (ULP) field 52 and user data field 53. Upper layer protocol field 52 indicates the upper layer protocol, such as UDP or TCP/IP. In accordance with the preferred embodiment of the present invention, a security association database (SAD) tag 54 is prepended to IP data packet 50 prior to processing, shown as item 50A. During pre-crypto packet processing, encapsulation headers 55 and 56 are added to the packet which are referred to as outer header 56 and IPSEC header 55. Outer IP header 56 is commonly referred to as the tunneling header. During processing step 404 (FIG. 4), user data 53, IP header and ULP 52 may be encrypted and/or authenticated, for example are shown as opaque data 58 in item 50C. Control information 59 is prepended to the completed IPSEC packet shown as item 50c for system use. A label field (not shown) may also be included in-between control information field 59 and outer header field 56. Also an authentication code shown as MAC 57 is included as part of a completed IPSec packet. The procedure for processing outbound IPSec packets is described in detail in FIG. 8 below.

Figure 6:
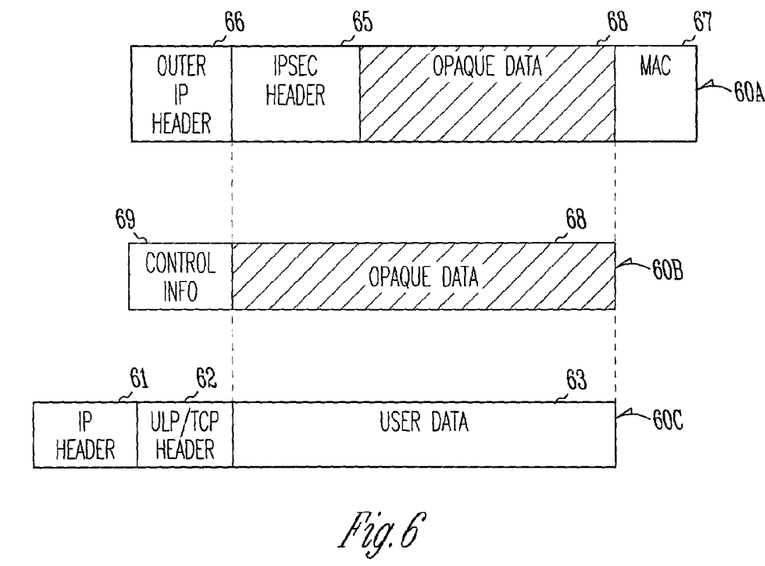
FIG. 6 illustrates a simplified diagram of an inbound IPSec data packet in accordance with a preferred embodiment of the present invention.

FIG. 6 illustrates a simplified diagram of an inbound IPSEC data packet in accordance with a preferred embodiment of the present invention. Inbound IPSEC packet includes outer IP header field 66, IPSEC header field 65 and opaque data field 68. Outer IP header 66 is commonly referred to as the tunneling header. Also an authentication code shown as MAC 67 is part of the IPSec packet. Control information 69 are appended to packet prior to crypto processing. A label field (not shown) may also be included before the outer IP heard field 66 in 60A, and before the IP header field 61 in packet 60C. Subsequent to crypto processing an inbound IPSEC data packet, the opaque data results in clear text data providing the IP header 61, ULP 62, and user data 63. This is shown as packet 60C. As used herein, opaque data refers to data that is either encrypted and authenticated, or data that is only authenticated. The procedure for processing inbound IPSec packets is described in detail in FIG. 9 below.

Figure 7:
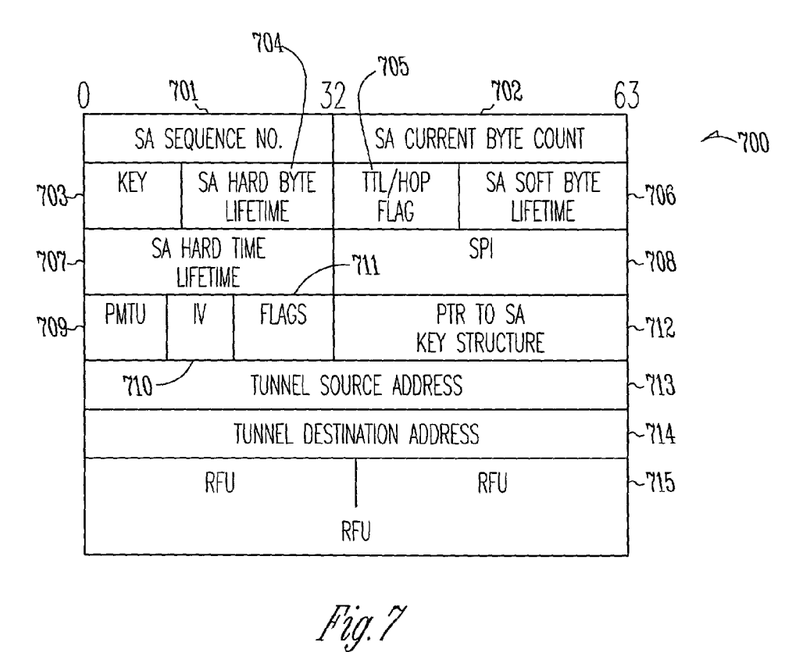
FIG. 7 illustrates a simplified example of a security association database entry for outbound IPSec data packets in accordance with a preferred embodiment of the present invention.

FIG. 7 illustrates a simplified example of a security association database (SAD) entry used for processing outbound IPSEC data packets in accordance with a preferred embodiment of the present invention. Although Table 700 illustrates specific locations for certain data elements, it should be understood that the particular data structure of Table 700 is not necessarily critical to the present invention. In other words, the elements of Table 700 may be distributed and stored in many different ways. In accordance with the preferred embodiment, a security policy is established between clients that wish to communicate. The security policy establishes such items as acceptable source and destination addresses, the ULP, permissible communication ports, etc. This information is stored preferably in a security policy database (SPD) which is desirably associated with security association database (SAD) entry for inbound packets (FIG. 10) and a SAD entry for outbound packets (FIG. 7).

Table 700 includes a security association sequence number 701 and security association current byte count 702. Key 703 is an 8-bit field used to verify that the SAD entry specified by the network processor is a valid SAD entry. Hop flag 705 is a field that when set identifies whether or not to copy the hop field from the SAD entry or to copy it from the inner header of the packet. Flags 711 include an anti-replay flag that identify if the SAD entry is to be terminated when the sequence number overflows, a protocol flag identifies whether or not the IPSEC protocol is an ESP or AH protocol, an internet protocol version flag identifies whether the tunnel IP address is an IPv4 or an IPv6 address, and a hashing flag indicates whether or not a hashing operation is to be performed on an ESP packet. For example, the case of ESP packets, a MAC field will be added at the end of the packet. Flags 711 also include an encryption flag that indicates whether or not encryption will be performed for ESP packets. Other flags may also be included in flag field 711. IV flag field 710 is preferably a two-bit field that indicates IV size and is valid when the encryption flag is set.

Outbound SAD entry table 700 also includes SPI number 708, pointer 712 to the Security Association key structure, tunnel source address 713, tunnel destination address 714, and fields 715. The use of the elements shown in table 700 will become apparent with the understanding of procedure 800 (FIG. 8) below.

FIG. 8 illustrates a simplified flow chart of a procedure for processing outbound packets in accordance with a preferred embodiment of the present invention. Procedure 800 is preferably performed by processing system 140 (FIG. 1) in conjunction with network processor 130 (FIG. 1), although other hardware and firmware systems may also be suitable. In general, outbound IP security packets that are to be routed out from network processor 130 are first routed though processing system 140 for IPSec processing. Although procedure 800 is described in accordance with a preferred embodiment for outbound packets implementing the IPSec tunneling protocol, it should be understood that the present invention may be equally applicable for implementing other tunneling techniques.

In step 802, a security policy look-up is performed and a security association database (SAD) entry address (i.e., a tag) is prepended to the outbound data packet. In addition, several labels may be prepended to the packet. Preferably, steps 802 and 804 of procedure 800 are performed by network processor 130, while steps 804 through 832 (below) are performed by processing system 140.

In step 804, the network processor 130 sends the outbound IP security packet to the input streaming interface, and in step 806, a channel is selected for processing the packet. Preferably, a least busy channel is selected. The selected channel is used to process the entire packet, and the packet is returned to the network processor. The entire packet is first buffered in an external memory (e.g., memory 156 of FIG. 3) which has portions thereof allocated to each channel. Preferably, the memory allocated is sufficient to hold at least two packets for each channel. In accordance with the preferred embodiment, the packet size is determined by the packet maximum transmission unit (PMTU) size for a particular tunnel. In accordance with one preferred embodiment, the input streaming interface may throttle the network processor when all channels are too busy to handle the packet.

In step 808, the SAD entry is read into a local buffer. Preferably input DMA engine 306 transfers the SAD entry to context RAM 308 (FIG. 1). Step 808 preferably also includes saving any labels to pre-append to the packet, and placing a "lock" (i.e., a semaphore) on the SAD entry to prevent other channels from modifying the SAD entry while it is being verified and updated in step 816. Preferably, a semaphore controller places the hold on the SAD entry thereby providing coherency necessary when processing many channels that may use the same security policy.

In step 814, the SAD entry is verified by comparing the SAD entry address prepended to the data packet with valid SAD addresses. If the SAD entry is invalid, the packet is dropped (step 810) and an error is logged (step 812).

In step 816, a hard lifetime check is preferably performed on the SAD entry along with a soft lifetime check. A hard lifetime failure indicates that the keys used for crypto operations have expired, while a soft lifetime failure indicates to that new keys should be re-negotiated in the near future. For soft lifetime failures, a messages is sent to the network processor to re-negotiate the key or keys. In the case of hard lifetime failure, the packet is dropped (step 810) and an error logged (step 812). Step 816 also performs a hard lifetime byte count. When the hard lifetime byte count is exceeded, the packet is dropped (step 810) and an error logged (step 812). When the software byte lifetime count has been exceeded, a log entry may also be created. Step 816 also includes calculating a total byte count for the outbound packet which is used to increment the SAD entry's current byte count. The total byte count preferably includes the additional bytes needed for the encapsulation headers constructed in steps 818 and 820 below. In the case of ESP packets, the current byte count is preferably increased by the additional length of the ESP header. After step 816 updates the SAD entry, the semaphore controller releases the "hold" on the SAD entry.

In step 818, an outer IP header (e.g., outer header 56 FIG. 5), referred to as the tunnel header, is constructed using information from the SAD entry. In accordance with the preferred embodiment, the outer IP header (e.g., the tunnel header) includes identification of the IP version, a tunnel source and tunnel destination address, an IPSec protocol type, header length and payload length. For IPv4 packets, a checksum value is calculated and written to the outer header. For AH packets, the outer header includes mutable fields that are removed and saved in context memory 308 (FIG. 1).

In step 820, an IPSec header (e.g., IPSec header 55 of FIG. 5) is created using information from the SAD entry. The IPSec header preferably includes at least a security policy index (SPI) number and an SA sequence number. Step 820 also includes prepending the IPSec header and outer IP header onto the outbound data packet. In addition, the labels that were prepended to the inner IP header in step 802 are appended to the outer IP header along with a status field. The status field, for example, may be a 32-bit field used to indicate success of an operation and is updated when an error occurs later in the processing.

In step 822, a preliminary packet maximum transmission unit (PMTU) check is performed to determine if the length of the packet, including the outer IP header and IPSec header exceed a PMTU value for the tunnel. The packet is preferably dropped if the PMTU value is exceeded. Preferably, when the PMTU value is exceeded, the originator of the packet is notified, for example, by way of a message to change the tunnel's PMTU.

After step 822, control information is prepended to the packet (e.g., control information 59 FIG. 5). The control information includes total packet length, byte offset for performing cryptographic and/or authentication operations (e.g., encryption and/or hash functions), flow direction and a pointer to a security association (SA) key structure. The security association key structure comprises keys used for encryption and/or authentication along with information identifying the encryption algorithm and authentication algorithm. Encryption algorithms, for example, may include but are not limited to DES, 3DES and AES. Authentication algorithms, for example, may include but are not limited to MD-5 and SHA-1.

In step 824, the packet is processed in a packet processing subsystem, such as crypto-packet processing subsystem 144 (FIG. 2). Crypto-core engine 340 (FIG. 3) notifies input crypto DMA engine 340 (FIG. 1) it's ready to processes a packet on one of the plurality of channels. Input crypto DMA engine 340 (FIG. 1) provides crypto-core engine 340 (FIG. 3) with blocks of the packet that are buffered in input FIFO 308 and input DMA engine 306 works to keep FIFO 308 full. Preferably, the packet is processed in one of the plurality of outbound channels selected in step 806, and the packet is moved into crypto-packet processing subsystem 144 in blocks of bytes (i.e., 64 byte blocks). The control information, prepended to the packet is used by crypto-packet processing subsystem 144 for processing the packet. In the case of ESP packets, an encryption operation is typically performed, and an authentication operation may be performed. In the case of AH packets, only an authentication operation is typically performed. When the crypto-packet processing subsystem 144 is finished processing each blocks of the packet, the processed blocks are sent to an output buffer. For example, output crypto FIFO 320 buffers each processed block, and output DMA engine transfers each processed block to external RAM 158. Preferably, output crypto FIFO 320 notifies crypto core engine 340 that it's ready to receive processed packets. Also, output crypto FIFO 320 retrieves state information (including mutable fields for AH packets) from the context RAM and saves in local registers.

In step 826, the packet's outer IP header is updated. In the case of AH packets the mutable fields that were removed in step 818 are restored. The total packet length is also retrieved from the inner IP packet. The processed blocks of the packet continue to be buffered and copied into an external buffer allocated to the channel. Preferably, an external memory such as external RAM 158 (FIG. 3) is used as the external buffer. The crypto-packet processing subsystem provides a status field that is appended to the end of the completed packet indicating when an error has been detected during processing.

In step 828, the status field of the processed packet is checked, and the packet is dropped (step 810) when the status field indicates an error. Preferably, an error log entry is also created (step 812) when an error is indicated. When an error is indicated, step 830 is performed. In step 830, the status field prepended after the first label in step 802 is updated. The label and status information are sent to the network processor indicating, for example, that the packet has successfully completed processing. When no error is indicated, a message authentication code (HMAC) is appended to the processed packet for ESP packets, while for AH packets, the HMAC is inserted into the header.

When an entire processed packet is completed and transferred to RAM 158, blocks of the processed packet may then be transferred by Rx DMA controller 324 to streaming interface 326. In step 832, the packet is streamed to the network processor, for example using streaming interface 326 (FIG. 3). Rx DMA controller 324 (FIG. 1) provides portions of the processed packet to streaming interface 326 is blocks of a predetermined size. Upon the completion of step 832, a packet is encapsulated in accordance with a security protocol such as the IPSec security protocol.

Figure 9:
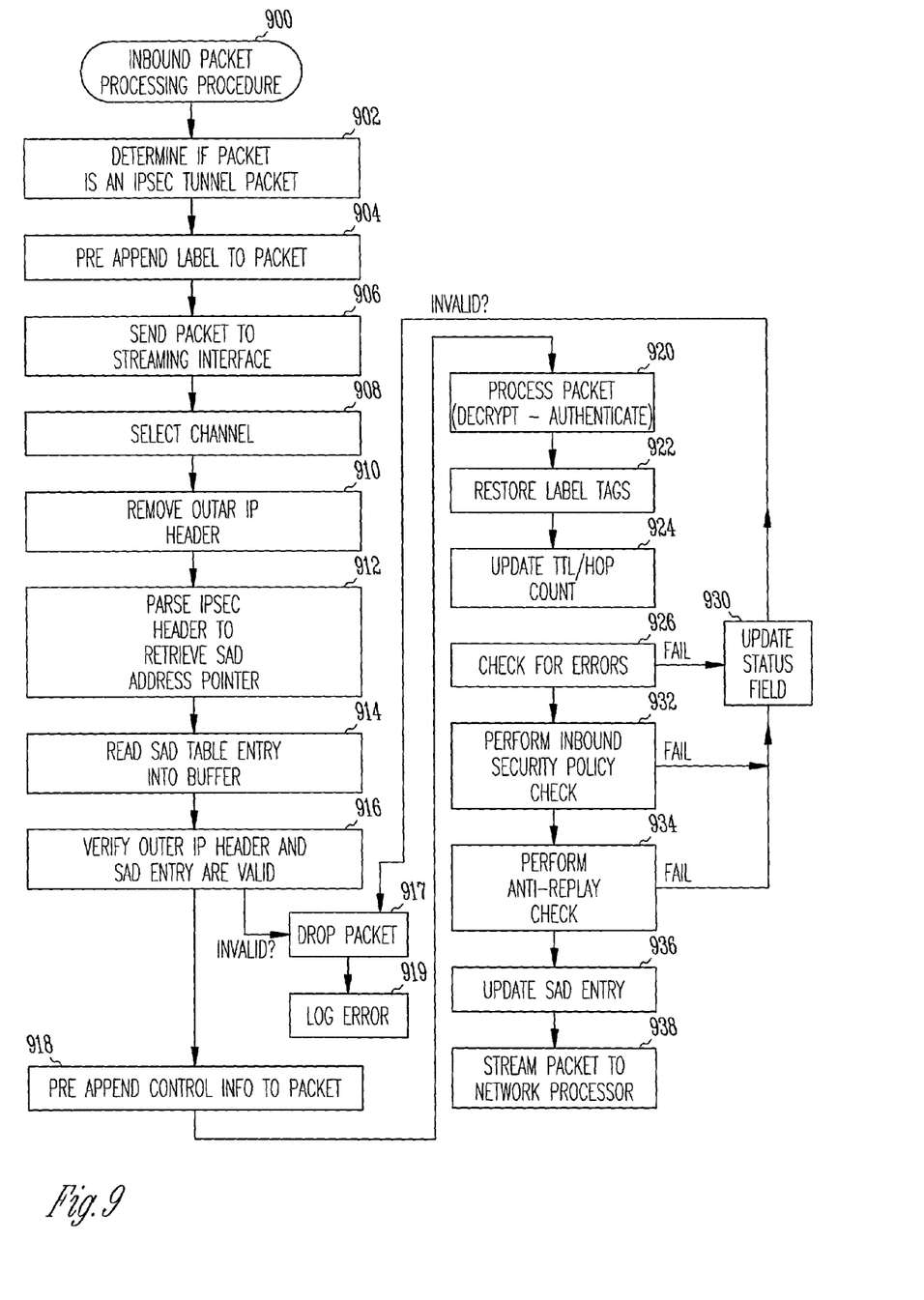
FIG. 9 illustrates a simplified flow chart of a procedure for processing inbound packets in accordance with a preferred embodiment of the present invention.

FIG. 9 illustrates a simplified flow chart of a procedure for processing inbound packets in accordance with a preferred embodiment of the present invention. Procedure 900 is preferably performed by processing system 140 (FIG. 1) in conjunction with network processor 130 (FIG. 1), although other hardware and firmware systems may also be suitable. In general, IP security packets that are received over a network by network processor 130 (FIG. 1) and are encapsulated in accordance with a specific protocol such as the IPSec security protocol, are routed though processing system 140. Although procedure 900 is described in accordance with a preferred embodiment for inbound packets implementing the IPSec security protocol, it should be understood that the present invention may be equally applicable for implementing other security protocols and techniques.

In step 902, IPSec security protocol packets are identified. Preferably, if the destination address is the destination address associated with the network processor (i.e., network processor 130 FIG. 1), the network processor parses the packet header to determine if the packet is an IPSec security packet. The packet header also identifies whether the packet is an AH or ESP IPSec security packet. When the packet is identified as an IPSec security packet, step 904 is performed.

In step 904, a label is prepended to the packet for use in packet processing. In step 906, the packet is streamed to the input streaming interface, and a Tx DMA controller buffers each block of the packet to an external memory. In step 908, a channel selected for processing the packet. In accordance with the preferred embodiment of the present invention, once a channel is selected for processing the packet, the selected channel used to receive and process each block of the packet. Portions of the external memory are allocated to each channel, and each portion is preferably is capable of holding at least two 64-byte packets.

After the entire packet is buffered in external memory, blocks of the packet are transferred to a local memory. For example, input DMA engine 306 (FIG. 1) transfers the 64-bit blocks of the packet into input FIFO 308 (FIG. 1). In task 910, the labels that were prepended to the packet in step 904 are removed and saved, and the outer IP header (e.g., outer IP header 66 FIG. 6), referred to as the tunnel header, is removed from the inbound IPSec packet. In task 912, the IPSec header is parsed to determine, for example, the IP version number (e.g., IPv4 or IPv6), the IPSec protocol type, header and payload lengths and the source and/or destination address. IPSec packets having invalid or missing header information are preferably dropped (step 917), and an exception logged in step 919.

Step 912 also includes parsing the IPSec header to determine the security policy index (SPI) value which is used to look-up a corresponding SAD entry. In accordance with a preferred embodiment, the SPI value is comprised of a pointer pointing to the SAD entry corresponding with the security policy database for the tunnel. Preferably, a portion of the SPI value is actually the address of the SAD entry. The SPI value also includes a portion that is a number that incremented with each new SAD entry that is reusing a SAD address. Accordingly, old packets that map to the SAD address that are being reused or retransmitted may be detected.

In step 914, at least a portion of the SAD table entry (FIG. 10) is read into a local buffer. Desirably, the portion of the SAD table entry is read into a portion of the local buffer local that is allocated to the channel selected for processing the inbound IPSec packet. Input DMA engine 306 preferably retrieves the SAD entry from an external memory and moves it into a portion of context RAM 308 allocated to the selected channel.

In step 916, the packet's outer header and SAD entry are validated. Preferably, the tunnel source address range or mask from the SAD entry is compared with the tunnel source address in the outer header. The SAD entry is verified by ensuring that the SPI number in the SAD entry is correct (e.g., correlates with the SPI number in the packet's IPSec header). A lifetime check is also performed based on the value of the hard lifetime value in the SAD entry to determine if the SAD entry has expired. Preferably the packet will be dropped (step 917) and an error log created (step 919) when the SAD entry is determined to have expired.

Step 916 also includes saving the outer header's total length and in the case of AH packets, clearing the mutable fields in the outer header. The mutable fields include fields in the outer header that may have changed during packet routing and cannot therefore be used for authentication.

In step 918, control information is appended to the beginning of the first block of the packet. The control information preferably is preferably three Dwords and contains packet length, byte offset for hash and decryption start points, flow direction (e.g., indicating an inbound or outbound packet), and a pointer to a SA key structure corresponding with the SAD entry.

In step 920, the packet is processed. In accordance with the preferred embodiment of the present invention, step 920 is performed by crypto-packet processing subsystem 144 (FIG. 2), steps 908 through 918 are performed by precrypto packet processing subsystem 142 (FIG. 2), and steps 922 through 938 are performed by post-crypto processing subsystem 146 (FIG. 2).

During the processing, input crypt DMA engine 310 transfers blocks of the packet to buffers in crypto core engine 340 for processing. As part of step 920, the outer header and IPSec header are removed, along with any trailers (e.g., ESP trailers) and padding. For example, ESP packets may specify additional padding that is appended to an encrypted IP packet. In this case, the inner IP header's payload length, for example, is compared with an expected length to detect padding. The case of ESP packets, the padding is removed prior to decryption.

Preferably, step 920 processes the IP packet in blocks of bytes (e.g., 64 byte blocks) by performing a cryptographic operation on the blocks. Depending on whether the packet is identified as an AH packet or an ESP packet, the cryptographic operation may include an authentication operation or a decryption and/or authentication operation. The keys and algorithms for the cryptographic operation are identified by the SAD entry. Step 920 writes processed blocks of the packet to output crypto FIFO 320 and output DMA engine 322 transfers the processed blocks to external RAM 158. The completion of step 920 results in an IP security packet substantially in the form of packet 60C (FIG. 6) buffered to external RAM 158. ESP packets are encrypted (i.e., the inner header and data fields are encrypted) and optionally, authentication is applied to encrypted portion. AH packets have authentication applied to the outer header as well as the encapsulated portion. Because portions of the outer header are changed during packet routing, the fields that may have changed, referred to as the mutable fields, are zeroed before authentication is performed on AH packets.

In step 922, label tags are restored to the beginning of the packet and a status word is inserted, preferably after the first label. The status word is used by the crypto-processing subsystem when the packet is finished processing to indicate if a processing error had occurred.

In step 924, the TTL/hop count value in the IP header is updated and a header checksum is recalculated after decrementing the TTL. Preferably, checksum calculations are performed by a hardware accelerator.

Step 926 is performed after the entire packet is processed. In step 926, the status word is checked to determine if an error was detected in step 920. The status word may also indicates when an HMAC compare error is detected. If an error has been detected, step 930 is performed and the packet is preferably dropped (step 917) and an error log entry is preferably created (step 919). In step 930, the first label prepended to the packet in step 922 along with the status word are updated and sent to the network processor.

In step 932, a security policy check is performed. Preferably, the source address identified in the inner IP header, which is now no longer encapsulated, is compared with the source address range in the corresponding SAD entry. When the packet fails the security policy check, the packet is preferably dropped (step 917) and an error log is created (step 919) and preferably sent to the network processor.

In step 934, an anti-reply check is performed to verify that the duplicates of the packet are not being received. When the packet fails the anti-reply check, the packet is preferably dropped (step 917) and an error log is created (step 919) and is preferably sent to the network processor.

In step 936, the current byte count field in the SAD entry is updated along with the anti-replay field. In Step 938, blocks of the processed packet are transferred from the external memory to a buffer allocated to the selected channel (e.g., Rx DMA controller 324), and the output streaming interface is notified that the packet is ready to be streamed to the network processor. Preferably, when an entire processed packet is completed and transferred to external RAM 158, blocks of the processed packet may then be transferred by Rx DMA controller 324 to streaming interface 326. In step 938, the packet is streamed to the network processor, for example using streaming interface 326 (FIG. 3). Rx DMA controller 324 (FIG. 1) provides portions of the processed packet to streaming interface 326 is blocks of a predetermined size.

Upon the completion of procedure 900, incoming IP security packets are no longer encapsulated in accordance with the security protocol. Preferably, procedures 800 and 900 that are implemented in the hardware configuration shown in FIG. 3 are embodied in assembly language code. It should be noted that a major advantage to the present invention is that the processor cores are not involved with the performance of many steps of procedures 800 and 900.

Figure 10:
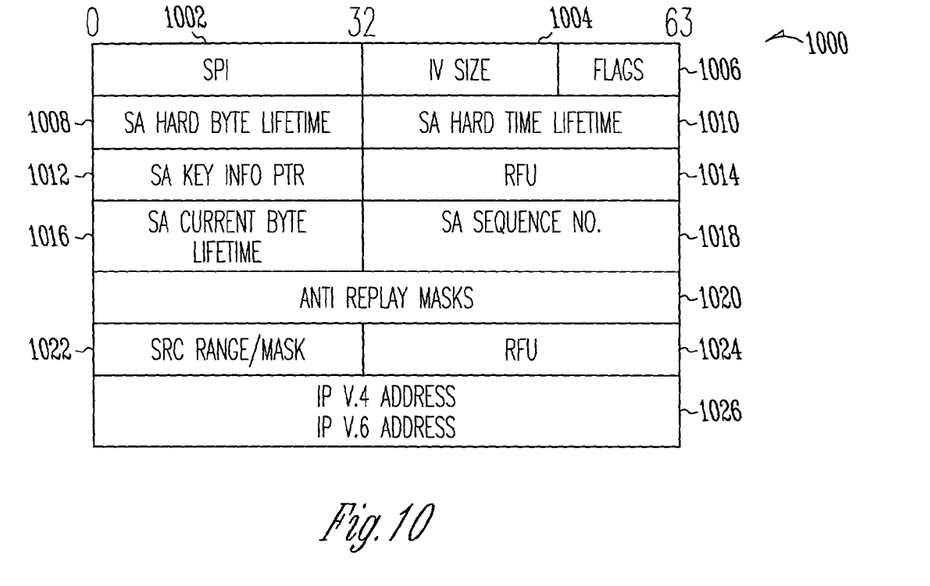
FIG. 10 illustrates a simplified example of a security association database entry for inbound IPSec data packets in accordance with a preferred embodiment of the present invention.

FIG. 10 illustrates a simplified example of a security association database (SAD) entry for inbound IPSec data packets in accordance with a preferred embodiment of the present invention. Inbound SAD entry 1000 is used for processing inbound IPSec security protocol packets in accordance with procedure 900 (FIG. 9). Although FIG. 10 illustrates only one SAD entry, it should be understood that the security association database is comprised of a inbound SAD entries for each security policy implemented by the system. SAD entry 1000 includes a security policy index number field 1002 for storing the SPI number, and IV size field 1004 and a flag field 1006. The flag field includes several flags such as an anti-replay flag indicating when anti-replay service is enabled, a protocol flag indicating whether the ESP or AH protocol is selected, a hashing flag for the ESP protocol to indicate whether authentication is included with the packet, an encryption flag for ESP packets indicating when encryption has been performed on the packet, a range flag indicating when a source range is a range or a subnet mask, a version flag indicating whether the source addresses are IPv4 or IPv6, a mode flag indicating whether ESP transport or tunnel mode is used, and a pre-crypto error flag for indicating errors detected in crypto-processing.

SAD entry 1000 also includes hard byte lifetime field 1008, hard time lifetime field 1010, key information pointer field 1012, RFU field 1014, current byte lifetime field 1016, and SA sequence number field 1018.

SAD entry 1000 also includes anti-replay masks 1020, source range/mask field 1022, RFU field 1024 and IPv4 address and IPv6 address field 1026.

Thus an improved packet processing system and methods of processing packets have been described. IPSec security packets are processed substantially in hardware providing for at least OC24 data rates. The packet processing system of the present invention is scalable so that many channels may be processed simultaneously.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A security data packet processing system comprising:
a transmitting (Tx) direct memory access (DMA) interface (314) receiving a streamed security data packet, selecting a least busy channel for processing the streamed security data packet, based on an amount of buffer space available for a channel in an external memory, and transferring the streamed security data packet to the external memory;
an input DMA engine (306) retrieving portions of the streamed security data packet from the external memory after all portions of the streamed security data packet have been transferred to the external memory;
an input FIFO (308) receiving the portions of the streamed security data packet from the input DMA engine (306) in blocks of a predetermined byte size, portions being retained in a portion of the input FIFO allocated to the selected channel;
a context RAM (308) receiving a security association database (SAD) entry associated with the selected channel, the SAD entry being retrieved from the external memory by the input DMA engine; and
an input crypto DMA engine (310) providing the blocks of the security data packet to a processing engine for processing.

2. The system as claimed in claim 1 further comprising:
an output crypto FIFO (320) receiving processed blocks of the security packet from the processing engine;
an output DMA engine (322) transferring the processed blocks of the security packet to an external output memory (158); and
a receiving (Rx) direct memory access (DMA) interface (324) retrieving the processed blocks of the security packet from the external output memory (158) after all portions of the processed security data packet have been transferred to the external output memory (158), and transferring the processed blocks of the security data packet to a streaming interface for streaming.

3. The system as claimed in claim 2 wherein the receiving (Rx) DMA interface (324) includes a plurality of registers storing length information each of a plurality of processed security data packets, the receiving (Rx) DMA interface (324) performing the retrieving in response to the storing of the length information for an associated processed security data packet.

4. The system as claimed in claim 1 wherein the context RAM (308) includes a portion storing program state information associated with the selected channel.

5. The system as claimed in claim 1 wherein when the security packet is an outbound IPSec security packet and wherein an outer header (56) and IPSec header (55) are added to the outbound IPSec security packet when portions of the packet are buffered in input FIFO (308).

6. The system as claimed in claim 1 wherein when the security packet is an inbound IPSec security packet and wherein an outer header (66) and IPSec header (65) are removed from the outbound IPSec security packet prior portions of the packet being buffered in input FIFO (308).

7. A method for processing a security data packet comprising:
receiving a streamed security data packet;

determining a least busy channel based on an amount of buffer space available for a channel in an external memory;

selecting, using a transmitting (Tx) DMA interface (314), the least busy channel for processing the streamed security data packet;

transferring the streamed security data packet to the external memory;

retrieving portions of the streamed security data packet from The external memory after all portions of the streamed security data packet have been transferred to the external memory;

transferring the portions of the streamed security data packet in an input FIFO (308) from an input DMA engine (306) in blocks of a predetermined byte size, portions being retained in a portion of the input FIFO allocated to the selected channel;

receiving at a context RAM (308), a security association database (SAD) entry associated with the selected channel, the SAD entry being retrieved from the external memory by the input DMA engine; and providing to an input crypto DMA engine (310) the blocks of the security data packet to a processing engine for processing.

8. The method as claimed in claim 7 further comprising:

receiving by an output crypto FIFO (320), processed blocks of the security packet from the processing engine;

transferring by an output DMA engine (322) the processed blocks of the security packet to an external output memory (158);

retrieving by a receiving (Rx) direct memory access (DMA) interface (324) the processed blocks of the security packet from the external output memory (158) after all portions of the processed security data packet have been transferred to the external output memory (158); and transferring the processed blocks of the security data packet to a streaming interface for streaming.

9. The method as claimed in claim 8 further comprising storing length information for each of a plurality of processed security data packets in one of a plurality of registers of the receiving (Rx) DMA interface (324), and wherein the receiving (Rx) DMA interface (324) performs the retrieving in response to the storing of the length information for an associated processed security data packet.

10. The method as claimed in claim 7 further comprising storing program state information associated with the selected channel in a portion of the context RAM (308) for the selected channel.

11. The method as claimed in claim 7 wherein when the security packet is an outbound IPSec security packet, the method further comprises adding an outer header (56) and IPSec header (55) to the outbound IPSec security packet when portions of the packet are buffered in input FIFO (308).

12. The method as claimed in claim 7 wherein when the security packet is an inbound IPSec security packet, the method further comprises removing an outer header (66) and IPSec header (65) from the outbound IPSec security packet prior to portions of the packet being buffered in input FIFO (308).

13. A method of processing an IPSec security protocol packet, the IPSec security protocol packet comprising an IPSec header, the method comprising:

buffering an IPSec security protocol packet in an external memory;

reading portions of the buffered IPSec security protocol packet into a first local buffer, the portions having a predetermined number of bytes;

verifying header information of the IPSec security protocol packet;

reading a security association database (SAD) entry into the first local buffer;

determining a least busy channel of a plurality of channels based on an amount of buffer space available for a channel in an external memory;

selecting the least bus channel for processing the IPSec security protocol packet;

processing the IPSec security protocol packet based on information in the SAD entry; and storing the processed IPSec security protocol packet in an external memory, wherein the external memory has a portion associated with the least busy channel.

14. The method as claimed in claim 13 further comprising parsing the IPSec header to retrieve a pointer to the SAD entry.

15. The method as claimed in claim 13 wherein prior to the processing step, the method includes prepending control information to the IPSec security protocol packet based on information the SAD entry, the control information for use in the processing step.

16. The method as claimed in claim 13 wherein the processing step includes performing a cryptographic operation on the IPSec security protocol packet, the cryptographic operation comprising either a decryption function or an authentication function when the IPSec security protocol packet is an inbound packet, and an encryption operation when the IPSec security protocol packet is an outbound packet.

17. The method as claimed in claim 13 wherein after the processing step, the method includes buffering the processed IPSec security protocol packet in a buffer allocated to the channel selected for the packet.

18. The method as claimed in claim 13 further comprising performing a security policy check on the processed IPSec security protocol packet, the security policy check comprising verifying that an IP source address is within a range of addresses identified by the SAD entry.

19. The method as claimed in claim 13 further comprising performing an anti-replay check on the processed IPSec security protocol packet, and updating a current byte count and anti-replay fields of the SAD entry.

20. An application specific integrated circuit for processing IPSec security protocol packets comprising:

an input streaming interface communicating with a network processor over a first streaming interface and receiving a streamed packet a transmitting (Tx) direct memory access (DMA) interface coupled to receive the streamed packet from the input streaming interface and configured to select a least busy channel from a plurality of channels for processing the streamed packet, based on an amount of buffer space available for a channel in an external memory;

an input buffer, having a portion thereof associated with each of the plurality of channels, for storing portions of the streamed packet along with control information for the packet;

a crypto core engine for performing IPSec cryptographic operations on the packet in accordance with the control information;

an output buffer, having a portion thereof associated with each of the plurality of channels, for storing processed portions of the streamed packet; and an output streaming interface for receiving the processed portions of the streamed packet from the output buffer and providing the network processor a processed IPSec packet over the streaming interface.

21. The ASIC as claimed in claim 20 further comprising a plurality of processing cores, each processing core associated with one of the plurality of channels and controlling the processing of an IPSec packet through the associated channel.

22. A method of processing data packets for implementing a security protocol, the method comprising:

receiving at an input streaming interface an IP data packet from a network processor, the IP data packet including a security association database (SAD) tag prepended thereto;

determining a least busy channel from a plurality of channels based on an amount of buffer space available for a channel in an external memory:

selecting the least busy channel for processing the IP data packet;

moving at least portions of the IP data packet in a first portion of a first buffer;

reading an SAD entry corresponding to the SAD tag into a second portion of the flint buffer;

prepending control information to the IP data packet;

processing the IP data packet by performing a cryptographic operation on the IP data packet to generate a security protocol data packet; and streaming the security protocol data packet from a second streaming interface to the network processor for transmission through the network.

23. The method as claimed in claim 22 wherein the security header and outer IP header are based on information from the corresponding SAD entry.

24. The method as claimed in claim 23 wherein the security protocol is an IPSec protocol, and wherein the security header is an IPSec header, and wherein the security protocol data packet is formatted in accordance with an IPSec security protocol.

25. The method as claimed in claim 22 wherein the cryptographic operation comprises either an encryption or authentication cryptographic operation, and wherein the method further comprising storing at least portions of the security protocol data packet in a second buffer.

26. The method as claimed in claim 22 further comprising, prior to the reading, obtaining a semaphore for the SAD entry to prevent modification of data within the SAD entry by other channels.

27. The method as claimed in claim 26 further comprising, subsequent to the reading, updating a byte count and sequence number in the SAD entry.

28. The method as claimed in claim 22 wherein the storing comprises buffering the portions of the security protocol data packet, the pardons comprising a predetermined number of bytes.

29. The method as claimed in claim 22 wherein the control information identifies an algorithm and key for the cryptographic operation to apply to the IP data packet.

30. The method as claimed in claim 22 further comprises checking a path maximum transmission unit (PMTU) value of the IP data packet including the security header and the outer IP header as prepended to the IP data packet to determine when the PMTU value exceeds a PMTU value for a tunnel through which the security protocol data packet is destined.

31. The method as claimed in claim 22 wherein the processing is performed by a crypto engine and wherein subsequent to the processing, the method further comprises prepending status information to the security protocol data packet, the status information being generated by the processing and identifying when the crypto engine detects an error.

32. The method as claimed in claim 22 wherein the streaming is performed when all portions of the security protocol data packet are stored in a second buffer.

* * * * *